United States Patent [19]
Lewis

[11] 3,867,566
[45] Feb. 18, 1975

[54] MIDSPAN ELECTRICAL CONDUCTOR SPACER

[75] Inventor: Paul E. Lewis, Mexico, Mo.

[73] Assignee: A. B. Chance Company, Centralia, Mo.

[22] Filed: Mar. 12, 1973

[21] Appl. No.: 340,323

[52] U.S. Cl.............. 174/146, 174/161 R, 174/169
[51] Int. Cl............................................. H02g 7/12
[58] Field of Search........ 174/40 R, 42, 146, 148 R, 174/149 R, 161 R, 169

[56] References Cited
UNITED STATES PATENTS

| | | | |
|---|---|---|---|
| 3,585,277 | 6/1971 | Lewis | 174/146 |
| 3,617,609 | 11/1971 | Tuttle | 174/42 |
| D204,456 | 4/1966 | Mason | 174/146 UX |

FOREIGN PATENTS OR APPLICATIONS

| | | | |
|---|---|---|---|
| 121,705 | 3/1931 | Austria | 174/42 |
| 1,563,904 | 3/1969 | France | 174/146 |
| 850,306 | 9/1952 | Germany | 174/146 |
| 939,459 | 2/1956 | Germany | 174/146 |
| 1,220,084 | 1/1971 | Great Britain | 174/42 |
| 63,677 | 2/1913 | Switzerland | 174/146 |

Primary Examiner—Laramie E. Askin
Attorney, Agent, or Firm—Schmidt, Johnson, Hovey & Williams

[57] ABSTRACT

A midspan spacer is provided for maintaining a plurality of high voltage, multiple phase electrical conductors in proper relative relationship under varying ambient weather and wind conditions. The spacer is adapted to be positioned midspan between adjacent pole or tower supports for the conductors. Clamp means grippingly engaging each of the conductors are joined to and supported by rigid spacer bars extending therebetween. The bars are preferably interconnected by apertured, toothed connection ferrules integrally attached to the ends of respective bars and disposed in meshing relationship to restrict relative rotation of the bars, with bolt means extending transversely through mated apertures of the ferrules to releasably attach the latter in preselected angular relationship

9 Claims, 10 Drawing Figures

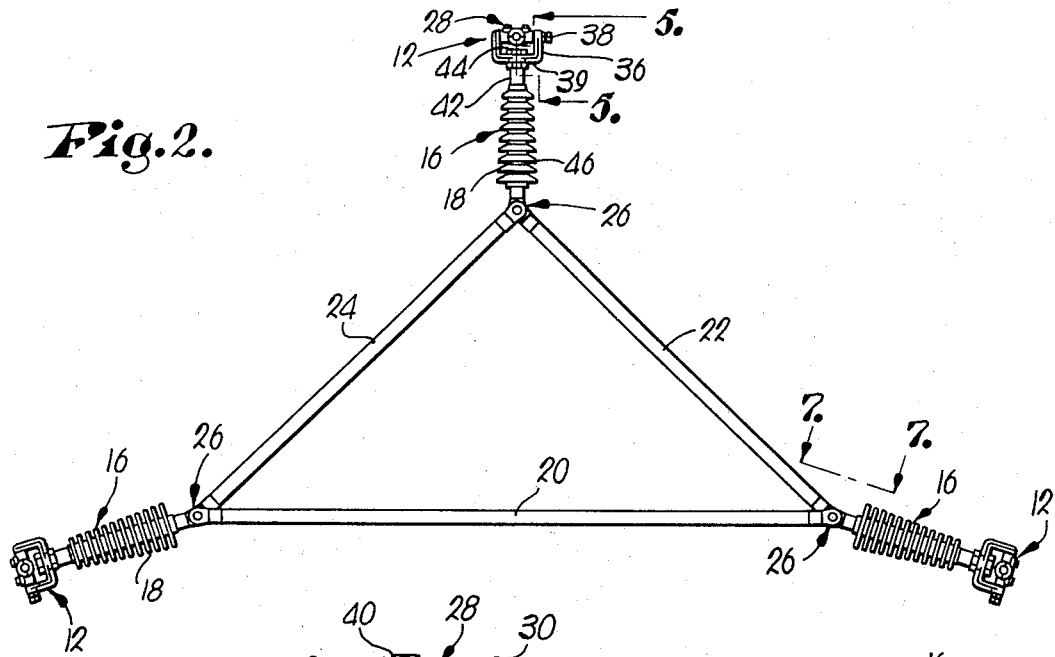
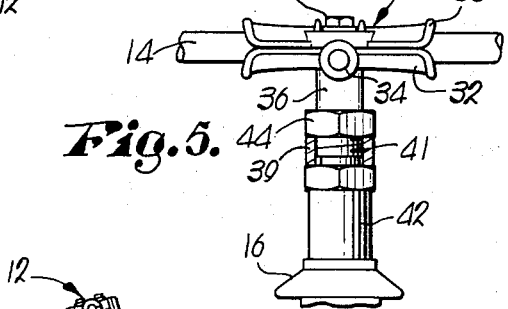
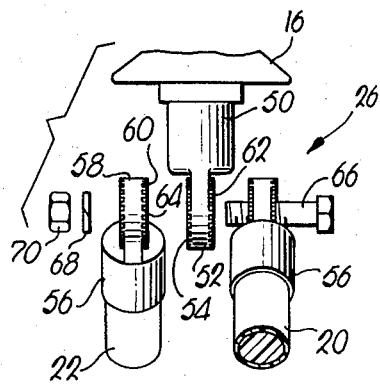
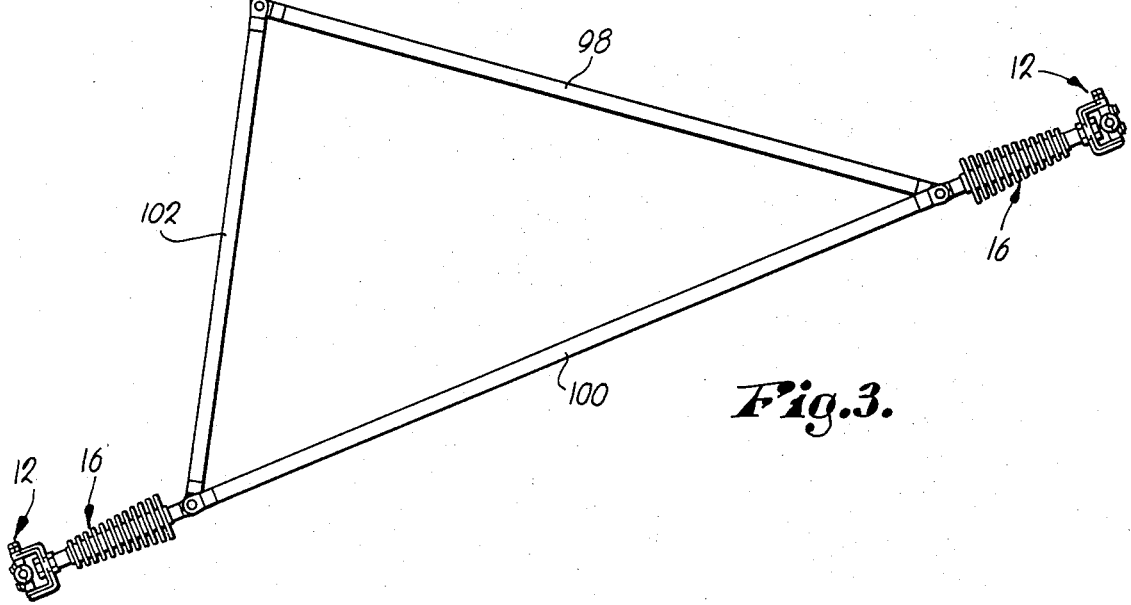

MIDSPAN ELECTRICAL CONDUCTOR SPACER

This invention relates to high voltage power transmission equipment and especially to spacers for maintaining adjacent high voltage conductors of a multiple phase transmission line in spaced relationship at midspan. More particularly, it relates to a spacer that is capable of maintaining a plurality of proximal conductors in proper spatial relationship and is adjustable at the site of use to permit utilization thereof in a variety of situations.

Overhead electric power lines are normally required to span relatively long distances between supporting poles or towers therefor. Such lines are commonly referred to as "transmission" or "distribution" lines, depending upon the line voltage carried thereby. In all cases however, the drape or sag of such lines between supporting structures varies according to the standards of a particular power company and the terrain over which it is erected. In order to assure adequate safety of operation, this drape is generally very carefully calculated in every instance.

Wind-induced vibration is a persistent operating hazard of overhead transmission lines, and a particularly troublesome and dangerous category of wind-induced line movements has traditionally been called "galloping." Although galloping transmission lines are not encountered during normal weather and atmospheric conditions, inclement cold weather which results in buildup of ice on the lee side of a conductor can cause a crude airfoil which, in conjunction with the torsional response of the conductor, can produce a varied assortment of violent wave motions. Conductors can actually touch or move toward each other to an extent to cause phase-to-phase arcing. This problem has been amplified in recent years because of the introduction of bundle conductor systems, since the latter have been observed vibrating in large amplitudes even when no ice was present.

An exemplary midspan conductor spacer of the prior art is shown in co-owned U.S. Pat. No. 3,585,277 wherein a single integral bar spacer is provided for maintaining a pair of adjacent conductors in spaced relationship. Although the assembly shown in that patent is extremely effective in maintaining a pair of conductors in a spaced relationship, it is not effectively usable when a multiplicity of conductors need to be kept relatively spaced.

Another problem encountered with the spacers of the prior art has been their integral nature and lack of adjustability in the field. As can be appreciated, in various situations it may be desirable to adjust the relative positions of the conductor-gripping clamps of the spacer assembly in the field at the site of use to compensate for particular spacing requirements at given points. In this way the exact spatial configuration of the conductors can be met with a single spacer unit. Otherwise, the spacer assemblies would either be useless in many situations or require readjustment of the transmission lines themselves in order to conform the latter to the predetermined spacing dimensions of the assembly.

A related problem of integral nonadjustable spacers is that they are necessarily very large and bulky, thus presenting problems of storage and shipping. In addition, the overall assembly must be sufficiently lightweight so that its weight does not unduly interfere with the predetermined drape of the lines or impose an undue burden thereon; conversely, the spacer must be of sufficient strength to withstand the substantial mechanical shocks and other forces exerted on the same when adjacent conductors tend to move relatively and particularly toward and away from each other.

Therefore, there is a need in the art for a strong, relatively lightweight midspan spacer that is rigid enough to maintain a plurality of proximal conductors in required aligned, spaced relationship during adverse weather or short circuit conditions while allowing necessary controlled movement thereof relatively under normal operating conditions, and which may be adjusted as necessary in the field to meet different uses and conductor conformations.

SUMMARY

Accordingly, it has been discovered that the aforementioned problems can be overcome by providing an adjustable midspan spacer which is capable of maintaining a plurality of proximal high voltage conductors in normal, predetermined spaced relationship under widely varying ambient conditions. The assembly broadly comprises means for attaching each conductor of a multi-conductor span with a common spacing assembly disposed within the space between the conductors. The spacing assembly is constructed from a plurality of interconnected spacer bars composed of lightweight, strong insulative material. The bars are interconnected to form a spacing assembly of predetermined configuration, depending upon the ultimate use.

In preferred embodiments, clamp structures are employed which include a saddle clamp in gripping engagement with the conductor and having a generally U-shaped yoke structure supporting the saddle clamp while allowing pivoting movement thereof about an axis extending transversely of the conductor; and an elongated, circumferentially skirted insulator interposed between the yoke structure and the spacer bars, the latter being attached to the end of the insulator removed from the yoke structure. In other embodiments, the attachment means can include grooved knobs which are fixedly secured to the conductors by means of conventional line ties.

In accordance with the invention, the spacer bars may be used to provide a variety of spacing assemblies. In one embodiment a single spacer bar is positioned in disposition extending inwardly from each of the clamp structures with all of the bars adjustably interconnected at a single hub point within the space between the conductors, thereby presenting an "open" spacing assembly. In another form, the spacer bars are all interconnected to present a closed, polygonal spacing assembly, and the clamp structures are adjustably connected thereto at respective apexes of the polygon. In such a case, the polygonal unit generally has a number of sides equal to the number of conductors to be maintained in spaced relationship, and there are a plurality of connection assemblies between the clamp structures and the spacing assembly at points of interconnection of the spacer bars. If, for example, it is desired to space three proximal conductors, the first embodiment outlined above would produce a "wye" configuration, while the latter would give a triangular or delta-shaped pattern.

The preferred adjustable connection assemblies for use in the invention comprise connection ferrules on the ends of the elements to be connected, the ferrules being provided with axially projecting, apertured segments. The respective apertures are adapted to mate in transverse axial alignment and bolt means or the like are provided which extend through the mated apertures and complete the connection. In other preferred embodiments the segments each have a series of teeth about the aperture thereof which extend radially inwardly from the periphery of the segment. The teeth of the respective segments are adapted to interengage, thereby facilitating adjustable connection of the various components.

The elongated, insulative spacer bars can be constructed of any material that has sufficient mechanical strength and is lightweight, but it is preferred that such bars are composed of fiber glass reinforced epoxy rods jacketed with an insulative layer of epoxy material. Similarly, the skirted insulators may likewise be fabricated from such materials or equivalents thereto such as porcelain in order to provide maximum electrical insulation characteristics with minimization of the weight of the overall midspan spacer. In preferred forms, these components are cast from a thermosetting, synthetic resin such as an epoxy material.

DRAWINGS

FIG. 2 is a front elevational view of the spacer assembly shown in FIG. 1;

FIG. 3 is a front elevational view of a midspan spacer in accordance with the present invention wherein the spacer bars are of varying lengths to accommodate a specialized spacing requirement such as unequally spaced conductors;

FIG. 5 is a fragmentary, side elevational view partially in section taken along irregular line 5—5 of FIG. 2, showing the saddle clamp assembly attached to a longitudinal conductor with a skirted insulator depending therefrom;

FIG. 6 is a fragmentary, exploded view showing the preferred adjustable connection assembly between an elongated insulator and a pair of spacer bars;

DETAILED DESCRIPTION

Figure 1:
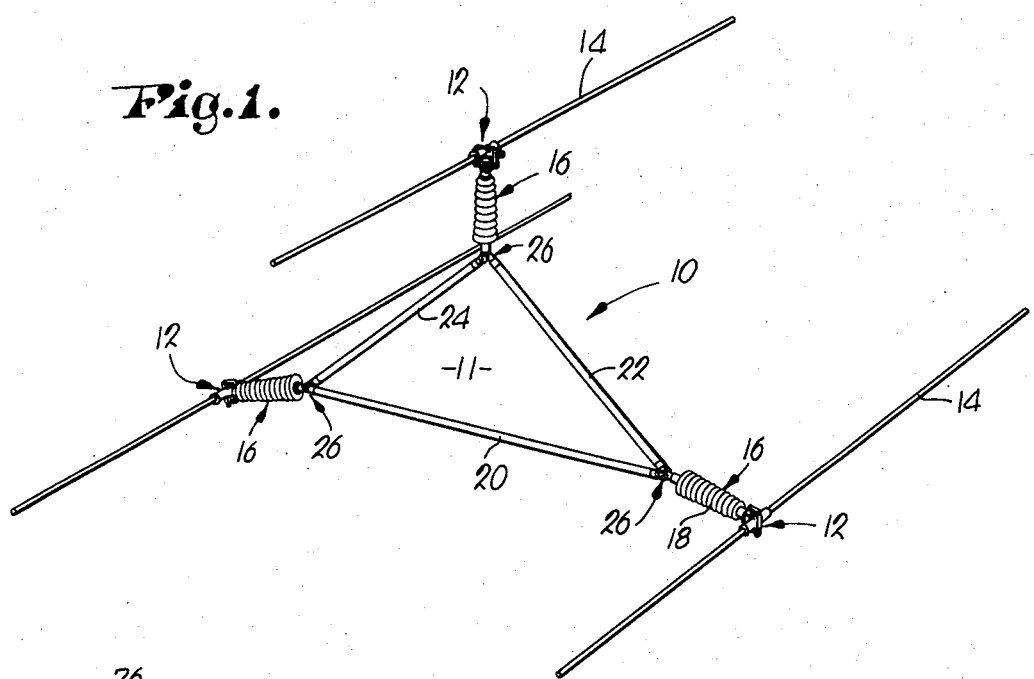
FIG. 1 is a perspective view of the midspan spacer of the present invention, shown in use spacing three proximal conductors.

An adjustable midspan spacer generally designated by the numeral 10 is shown in perspective in FIG. 1 as it would appear when in use. In general, the spacer comprises a plurality of clamp structures 12 each grippingly engaging a respective proximal conductor 14.

An elongated, skirted insulator 16 having a series of spaced, circumferentially extending transverse skirts 18 is interposed between each clamp structure 12 and the spacing assembly 11 made up of spacer bars 20, 22 and 24.

Spacing assembly 11 presents a triangular or delta configuration with each of the aforementioned spacer bars serving to connect and space adjacent conductors with all of the bars being interconnected to form the closed spacing assembly. In the embodiment of FIG. 1 there are three identical connection assemblies 26 at the respective apexes of the triangle which serve to interconnect all of the bars as described.

Referring now to specific details of the invention, FIGS. 2 and 5 illustrate the preferred clamp structure. It comprises a trunnion-mounted saddle clamp 28 which includes a pair of elongated, grooved gripping elements 30 and 32 which are adapted to cooperatively grip conductor 14 when placed in the opposed relationship best shown in FIG. 5. Axle defining members 34 extending transversely between the upstanding legs of U-shaped yoke member 36, are pivotally maintained therein by respective fasteners 38. Gripping element 32 is integral with axle members 34, and the second gripping element 30 is removably located in opposed relationship to member 32 to grip conductor 14, with bolts 40 serving to tighten and secure the clamp presented thereby.

Yoke member 36 is apertured at approximately the midpoint of its transverse bight portion 39 and is adapted to be slipped over an upstanding threaded post portion 41 of ferrule 42 which, in turn, is integrally attached to insulator 16. Yoke structure 36 is then secured to insulator 16 by means of nut 44 mounted over the threaded post portion of ferrule 42.

In other embodiments, the yoke 36 can be an integral, generally Y-shaped member with a hollow leg adapted to be attached to an unthreaded, upstanding portion of insulator 16. In such a case, the member is preferably attached by gluing the yoke onto insulator 16 with epoxy glue or the like.

Insulators 16 are preferably interposed between each yoke structure 36 and the spacing assembly 11, and each is of a length so that when combined with another insulator, the combination thereof will provide adequate insulation and protection against flashover for the line voltage carried by conductors 14.

The attachment means described above are of particular utility because of their inherent adjustability and the excellent mechanical connection obtained thereby. However, in other instances (see FIG. 10) a knob 104 or other like member which is grooved for the reception of the conductor can be employed in conjunction with well-known line ties. In such a case, the conductor is seated within the groove 106 and tensionably retained therein by the line ties 108 to form a secure connection therebetween.

As described above, each insulator 16 is provided with a series of spaced, circumferentially extending, transverse skirts 18 along the length thereof in order to increase the current leakage path along the surface of the insulator. These skirts can be tapered downwardly as shown at 46 in FIG. 2, or they can be of dimensions causing the insulator body to be untapered with respect to the longitudinal axis of the insulator. As is well known in the art, the tapered configuration is often chosen for the insulator positioned atop the assembly in order to assure rapid draining of rainwater or other moisture from the body of the insulator and to increase the flashover resistance of the insulator. Similarly, the untapered configuration is selected for the lower insulators in order that moisture quickly and easily runs off the insulator body without collecting.

A lightweight metallic connection ferrule 50 is integrally attached to the end of the elongated insulator 16 removed from yoke structure 36. As with ferrule 42, this integral attachment can be effected by threadably mounting the ferrules on the insulator or bonding the components together with epoxy adhesive material. Connection ferrule 50 has an axially projecting, apertured, flattened integral segment 52. The outermost end of segment 52 is of semicircular shape and segment 52 is provided with a circular series of spaced, radially disposed teeth 54 projecting from opposed flat faces thereof and located in complemental relationship to the circular periphery of the segment and extending inwardly from the circular edge toward the main body of the ferrule.

Figures 8, 9:
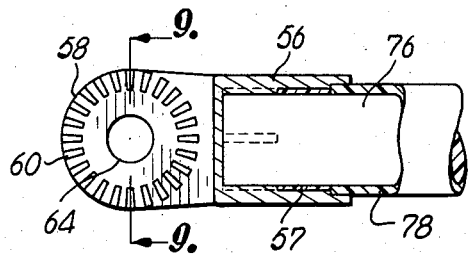
FIG. 8 is a fragmentary, side elevational view partially in section showing the connection end of a spacer bar having an apertured, toothed connection ferrule integrally connected thereto.
FIG. 9 is a side elevational view taken along line 9—9 of FIG. 8 looking in the direction of the arrows to more effectively illustrate the apertured, toothed portion of a connection ferrule.

Referring specifically to FIG. 6, connection assembly 26 is depicted in exploded relationship, showing ferrule 50 and the other components of the overall assembly. Each of the spacer bars 20 and 22 is also provided with integal connection ferrules 56 which, in a manner similar to ferrule 50, have axially projecting segments 58 that are apertured and provided with peripheral, inwardly extending teeth 60 on opposed flat surfaces of corresponding segments and of the same diameter and relative spacing as teeth 54. As a consequence, all of the connection ferrules may comprise identical parts of manufacturing and inventory economy. As shown in FIG. 8, such ferrules may be connected to the bars or other elements by means of epoxy glue 57 or other similar expedients.

The toothed ferrules 50 and 56 of the insulator and spacer bars are adapted to mate when placed in an opposed, meshing relationship, thereby positioning the respective apertures 62 and 64 thereof in transverse axial alignment while releasably restricting the relative rotation between insulator 16 and spacer bars 20 and 22. Coupling means in the nature of bolt 66 extends transversely through each of the apertures 62 and 64 and is held in place by corresponding lock washers 68 and nuts 70 to interconnect the components of the entire connection assembly 26.

Because of the diameters of respective spacer bar ferrules 56, it is sometimes difficult to align the spacer bars with a small acute angle therebetween as could be required in specific situations. In such a case it has been found advantageous to interpose a circular disc-like spacer element 72 having teeth on opposite flat faces thereof between segment 52 of insulator 16 and one of the segments 58 of the spacer bars 20 or 22. In practice, the opposed sets of teeth on the respective faces of spacer 72 are offset relatively such that the teeth on one face thereof are aligned with the complementary spacings between teeth on the opposed face. In this way, the ferrules 56 are sufficiently spaced apart to reduce any interference therebetween.

Figure 7:
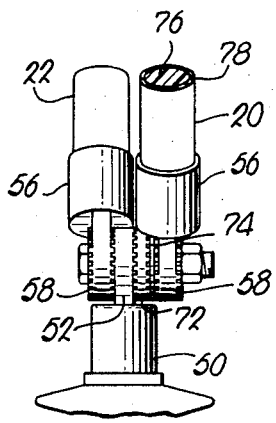
FIG. 7 is a fragmentary, side elevational view taken along line 7—7 of FIG. 2, showing another embodiment of the connection assembly of the present invention.

As can be appreciated, by virtue of the meshing of the teeth of the respective connection ferrules, the spacer bars can normally only be connected with certain specific angles therebetween. That is, because the teeth of the respective ferrules are placed at predetermined points about the periphery of the axially extending segments, only angles corresponding to the specific positions of these teeth are obtainable. If angles not in such correspondence are desired for a particular application, a conventional, relatively thin apertured washer 74 (FIG. 7) can be interposed between one set of the toothed, interengaging surfaces of the connection assembly 26. In this way, the teeth thereof are precluded from meshing and the respective bar can be adjusted for form angles not normally obtainable. By employing washer 74, the connection assembly can be modified to give any desired angle between the spacer bars 20 and 22. It was also found that use of a single washer 74 to bar interengagement of a pair of toothed segments normally meshed together does not appreciably detract from the overall mechanical strength of the connection assembly 26. Thus, it is possible to achieve any desired angle between the respective bars while maintaining mechanical integrity of the entire spacer assembly 11.

As discussed above, the spacer bars for use in the invention must possess good electrical insulating capabilities and also have sufficient mechanical strength to maintain the predetermined spaced relationship of the conductors under extreme weather conditions and relatively high compression loads. Moreover, they must be sufficiently lightweight so that undue stress is not placed upon the conductors at midspan, thus distorting the desired drape or spacing relationship thereof. In accordance with the invention it has been found that insulative spacer bars composed of a fiber glass reinforced epoxy core 76 jacketed with a layer of epoxy material 78 can advantageously be employed. Such bars are extremely efficient insulators, are light in weight, and are extremely strong and rugged.

In practice, it has been found that an epoxy composition including 2,2-bis($p$-hydroxyphenyl) propaneglycidyl ether polymer, from 15 to 65 percent by weight of an aliphatic polyglycidyl ether or ester, and from 0.01 to 3 percent by weight of an alkylidene bis, tris or polyphenol is particularly advantageous when used to form at least the outer jacket portion of the spacer bars as well as insulators 16.

The midspan spacers produced in accordance with the invention can be constructed with the spacing assemblies thereof in a variety of configurations. As shown in FIGS. 1 and 2, a closed triangular pattern is formed by the interconnection and location of spacer bars 20, 22 and 24 between three adjacent conductors. As can be appreciated, with a greater number of conductors, a closed, polygonal spacing pattern would result with individual spacer bars connected between adjacent conductors and ultimately interconnected together.

Figures 4, 10:
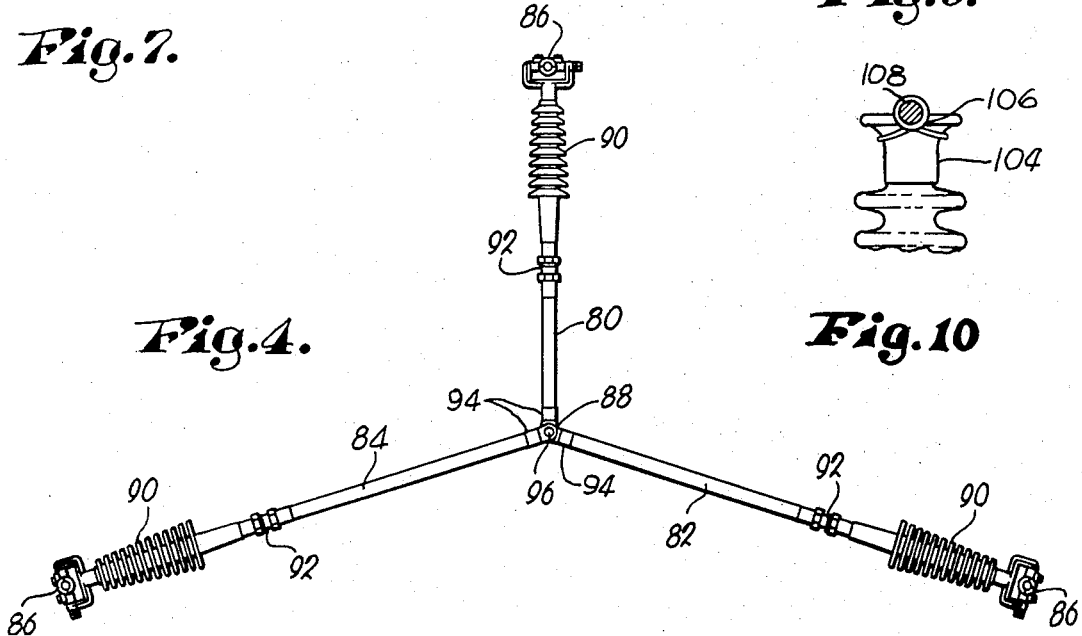
FIG. 4 is a front elevational view of another embodiment of the midspan spacer of the invention, showing an open "wye" configuration.
FIG. 10 is a fragmentary, elevational view depicting a grooved, knob-like end of a skirted insulator with a conductor operatively seated and retained therein.

In another embodiment shown in FIG. 4, an "open" spacing assembly is formed by three bars 80, 82 and 84 which extend inwardly from the three conductors to which the clamp structures 86 are coupled. The bars are adjustably interconnected by a connection assembly 88 at a single, centrally located hub point within the space between the conductors. Each of the conductor clamp structures 86 and elongated insulators 90 are identical to those described above. However, by virtue of the fact that only a single adjustable connection is required in this configuration, the spacer bars 80, 82 and 84 are preferably unitary with their respective insulators. As shown in FIG. 4, the bars can advantageously be threadably mounted in axial alignment with their respective insulators through conventional coupling members 92 to form a substantially unitary structure, there being no need for an adjustable connection between these components. In such a case the clamp structures 86 are positioned and set in place during manufacture, and the entire apparatus can be shipped as three separate, elongated components along with the associated connection structure described.

The connection assembly 88 is in all respects identical to that described above, in that each of the bars 80, 82 and 84 has an integrally connected ferrule 94 attached at the connection end thereof. Each ferrule 94 has an axially projecting, peripherally toothed, apertured connection segment integral therewith. A transversely extending bolt 96 extends through the mated apertures of the ferrules and secures the latter in releasably fixed spacing alignment, as described above.

Yet another embodiment of the invention in shown in FIG. 3 where a generally triangularly shaped spacing pattern is formed by bars 98, 100 and 102. In this case, each of the bars is of varying length in order to accommodate special spacing requirements. Such a spacer could be needed when, for example, the conductors must be turned within a span because of a change of pole structures supporting the conductors. In all other respects, the assembly shown in FIG. 3 is identical with those described above, it being shown only to illustrate the flexibility of the present invention in providing midspan spacers of varying dimensions.

When it is desired to install the spacers of the present invention in the field, the following procedure is generally followed, assuming that the delta-shaped spacing assembly of FIG. 1 is being employed. The respective conductor assemblies including saddle clamps 28 and U-shaped yoke structures 36, are hung on the conductors at midspan and the latter placed in gripping relationship thereto. The elongated insulators 16 are then attached to yoke element 36 by means of nut 44. Spacer bars 20, 22 and 24 of proper length are subsequently connected to each of the free ends of the insulators 16 to form spacing assembly 11. This latter step is accomplished by simultaneously aligning the toothed segments of an insulator 16 with those of two of the spacer bars, followed by bolting the same together to form connection assembly 26. This is repeated for each of the three required connections at the apexes of the triangle, thus interconnecting all of the spacer bars to form the closed triangular spacing assembly.

As can be appreciated, various factors such as sagging practices, temperature changes, pole modifications, and spacings therebetween can cause untoward changes in the relative disposition of the conductors. The inherent adjustability of the midspan spacer of the present invention as depicted in FIG. 1 allows minor adjustments in the field, i.e., the installer can adjust the respective insulators relative to the spacing assembly in order to achieve a particular connection or spacing requirement.

Another feature of the present invention results from the fact that the individual components which make up the overall spacer assembly can be stored, shipped, and used individually. Thus, the manufacturer or electrical utility can store spacer bars or the like of given dimensions in accordance with their needs, and can utilize the latter in conjunction with previously installed midspan spacers which require replacement of only some individual parts thereof. Hence, repair and maintenance costs are substantially reduced because the necessity of replacing the entire spacer is avoided and only a particular component thereof fails.

A particularly important aspect of the preferred spacer assemblies of this invention is the fact that pivotal mounting of clamp 12 on corresponding insulators allows restricted relative motion thereof during normal operating conditions, but restrains undue motions and vibrations of the same under deleterious weather or during short-circuits or transient voltage surges.

Having thus described the invention, what is claimed as new and desired to be secured by Letters Patent is:

1. An adjustable midspan spacer for maintaining proximal high voltage conductors in spaced relationship, comprising:
   separate attachment means corresponding in number to said conductors and operable to grippingly engage one of the latter;
   a plurality of rigid insulative spacer bars interconnected to define a closed, generally planar, polygonal spacing assembly, said assembly being of dimensions permitting the positioning thereof within the space between said conductors and generally transversely of the longitudinal axes of the latter; and
   means adjustably connecting each of said separate attachment means to said spacing assembly at fixed, spaced locations thereon,
   said adjustable connector means permitting independent pivoting movement of each of said separate attachment means relative to said spacing assembly in the plane thereof and about said locations,
   said adjustable connector means also including mechanism for releasably locking each of said separate attachment means at desired orientations relative to said assembly and in the plane thereof.

2. The midspan spacer of claim 1, wherein said spacer bars are interconnected at the respective extremities thereof to define said spacing assembly, said attachment means being connected to the latter at the points of interconnection of said spacer bars and extending outwardly from said assembly.

3. The midspan spacer of claim 2, wherein each of said attachment means includes an elongated insulator adjustably connected at one end thereof to said spacing assembly and having conductor-gripping means at the remaining end thereof.

4. The midspan spacer of claim 3, wherein said conductor-gripping means comprises a saddle clamp adapted to grippingly engage one of said conductors and provided with generally U-shaped yoke structure supporting said saddle clamp and allowing pivoting movement thereof only about an axis extending transversely of the conductor.

5. The midspan spacer of claim 3, wherein said conductor-gripping means comprises a grooved knob member configured to receive one of said conductors therein.

6. The midspan spacer of claim 3 wherein said adjustable connector means comprises:
   a ferrule secured to each end of each spacer bar which is in opposed, proximal relationship to the end extremity of an adjacent spacer bar, and to each end of the respective insulators remote from the conductor-gripping means thereof, each of said ferrules being provided with an axially extending, transversely apertured segment, the segments of adjacent ferrules being in abutting relationship with the apertures thereof in axial alignment, the abutting faces of adjacent ferrule segments being of generally flat configuration and provided with spaced, outwardly projecting teeth arranged in a circular pattern and in meshing engagement with the teeth of an opposed segment for interlocking adjacent ferrules; and releasable mechanism extending through the aligned apertures of abutting ferrule segments to releasably interconnect the same.

7. The midspan spacer of claim 6 wherein a transversely apertured spacer is interposed between a pair of said abutting ferrule segments to allow greater degrees of relative rotation therebetween, said apertured spacer comprising a relatively thin element having teeth on the opposed faces thereof, said teeth being in meshing engagement with the teeth of said pair of segments with the aperture of said spacer being in alignment with the apertures of said segments.

8. The midspan spacer of claim 6 wherein a thin, apertured washer is interposed between a pair of said abutting ferrule segments.

9. The midspan spacer of claim 1 wherein said spacer bars are formed of fiberglass reinforced epoxy core rod jacketed with a coating of insulative epoxy material.

* * * * *